(12) United States Patent
Kaida et al.

(10) Patent No.: US 8,730,575 B2
(45) Date of Patent: May 20, 2014

(54) WIRE-GRID POLARIZER AND PROCESS FOR PRODUCING THE SAME

(71) Applicant: Asahi Glass Company, Limited, Tokyo (JP)

(72) Inventors: Yuriko Kaida, Tokyo (JP); Hiroshi Sakamoto, Tokyo (JP); Takahira Miyagi, Tokyo (JP); Hiromi Sakurai, Tokyo (JP); Yasuhiro Ikeda, Tokyo (JP); Eiji Shidoji, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/657,566

(22) Filed: Oct. 22, 2012

(65) Prior Publication Data

US 2013/0044373 A1 Feb. 21, 2013

Related U.S. Application Data

(60) Division of application No. 13/137,214, filed on Jul. 28, 2011, now abandoned, which is a continuation of application No. PCT/JP2010/051633, filed on Feb. 4, 2010.

(30) Foreign Application Priority Data

Feb. 5, 2009 (JP) .................. 2009-025051

(51) Int. Cl.
*G02B 5/30* (2006.01)
(52) U.S. Cl.
USPC .................................. 359/485.05
(58) Field of Classification Search
USPC ..................... 359/485.05, 487.03
See application file for complete search history.

(56) References Cited

U.S. PATENT DOCUMENTS 3,293,331 A 12/1966 Doherty
4,241,109 A 12/1980 Johnson
(Continued)

FOREIGN PATENT DOCUMENTS

EP 1 887 390 A1 2/2008
JP 2005-070456 A 3/2005
(Continued)

OTHER PUBLICATIONS

International Search Report mailed Mar. 9, 2010, in PCT/JP2010/051633.

(Continued)

*Primary Examiner* — Ricky D Shafer
(74) *Attorney, Agent, or Firm* — Foley & Lardner LLP (57) ABSTRACT

Disclosed are a wire grid polarizer, which exhibits high polarization, p-polarized light transmittance, and s-polarized light reflectance in the visible light region, and the optical characteristics of which have low angular dependence and wavelength dependence, and a manufacturing method for the same. A wire grid polarizer (10) comprises a light transmissive substrate (14), on the surface of which a multiplicity of convex strips (12), the width of which gradually narrows from the base to the apex, is formed parallel to one another with intervening flat spots (13) formed between the convex strips (12), and at a specified pitch (Pp), and a metallic layer (20), which covers the entire surface of a first side face (16) of the convex strip (12) and a portion of the flat spot (13) adjacent thereto, and either does not cover a second side face (18) of the convex strip (12) or covers a portion of a second side face (18); and a manufacturing method forms a metallic layer (20) by vapor depositioning a metal or metal compound from a direction that is substantially orthogonal to the length direction of the convex strips (12) and forms a 25-40 DEG angle relative to the height direction of the convex strips (12) on the side of the first side face (16), under conditions in which the deposition amount is 40-60 nm.

5 Claims, 4 Drawing Sheets

(56) References Cited

U.S. PATENT DOCUMENTS

| | | |
|---|---|---|
| 7,002,742 B2 | 2/2006 | Imaizumi et al. |
| 7,872,803 B2 | 1/2011 | Uejima et al. |
| 2002/0191286 A1 | 12/2002 | Gale et al. |
| 2003/0180024 A1 | 9/2003 | Edlinger et al. |
| 2005/0046943 A1 | 3/2005 | Suganuma |
| 2005/0123588 A1 | 6/2005 | Zhu et al. |
| 2006/0119937 A1* | 6/2006 | Perkins et al. ................. 359/486 |
| 2006/0274415 A1 | 12/2006 | Murata |
| 2007/0152358 A1 | 7/2007 | Suganuma |
| 2007/0217008 A1 | 9/2007 | Wang et al. |
| 2007/0242187 A1* | 10/2007 | Yamaki et al. .................. 349/96 |
| 2007/0273972 A1 | 11/2007 | Okayasu |
| 2008/0018997 A1 | 1/2008 | Kawazu et al. |
| 2008/0129931 A1 | 6/2008 | Takahashi et al. |
| 2008/0137188 A1* | 6/2008 | Sato et al. ..................... 359/486 |
| 2009/0052030 A1 | 2/2009 | Kaida et al. |
| 2010/0103517 A1 | 4/2010 | Davis et al. |
| 2010/0134719 A1* | 6/2010 | Johns et al. ..................... 349/62 |
| 2011/0052802 A1 | 3/2011 | Kaida et al. |
| 2011/0080640 A1 | 4/2011 | Kaida et al. |
| 2011/0096396 A1 | 4/2011 | Kaida et al. |

FOREIGN PATENT DOCUMENTS

| | | |
|---|---|---|
| JP | 2005-172955 A | 6/2005 |
| JP | 2005-181990 A | 7/2005 |
| JP | 2006-003447 A | 1/2006 |
| JP | 2008-256883 A | 10/2008 |
| JP | 2008-279597 A | 11/2008 |
| WO | WO-2006/064693 A1 | 6/2006 |
| WO | WO-2009/123290 A1 | 10/2009 |
| WO | WO-2009/125751 A1 | 10/2009 |

OTHER PUBLICATIONS

Non-Final Office Action U.S. Appl. No. 13/137,214 dated Jul. 20, 2012.

Non-Final Office Action U.S. Appl. No. 13/137,214 dated Apr. 3, 2012.

Extended Supplementary European Search Report dated Jun. 9, 2013, European Application No. 10 73 6599.9.

* cited by examiner

WIRE-GRID POLARIZER AND PROCESS FOR PRODUCING THE SAME

CROSS-REFERENCE TO RELATED APPLICATIONS

This application is a divisional of U.S. application Ser. No. 13/137,214, filed Jul. 28, 2011, now ABANDONED, which is a continuation of International Application PCT/JP2010/051633, with an international filing date of Feb. 04, 2010, the disclosures of which are hereby incorporated herein by reference in their entireties.

TECHNICAL FIELD

The present invention relates to a wire-grid polarizer and a process for producing the same.

BACKGROUND ART

As polarizers (also referred to as polarization splitters) used for image display devices, such as liquid crystal display devices, rear-projection televisions and front projectors, and showing a polarization separation ability in a visible light region, there are absorptive polarizers and reflective polarizers.

An absorptive polarizer is, for example, a polarizer having a dichroic dye, such as iodine, aligned in a resin film. Such an absorptive polarizer has a low light use efficiency because of absorbing one of polarized light waves.

On the other hand, a reflective polarizer has a higher light use efficiency since light that has been reflected without entering the polarizer is allowed to enter. For this reason, a demand for such a reflective polarizer is growing for the purpose of increasing the luminance of e.g. liquid crystal display devices.

A reflection polarizer is classified into a linear polarizer composed of laminated, birefringent resin films, a circular polarizer composed of a cholesteric liquid crystal, and a wire-grid polarizer.

Such a linear polarizer and a circular polarizer have a low polarization separation ability. For this reason, such a wire-grid polarizer showing a high polarization separation ability attracts attention.

A wire-grid polarizer is configured to have a plurality of fine metallic wires disposed in parallel to one another on a light-transmitting substrate. When the pitch between of adjacent fine metallic wires is sufficiently shorter than the wavelength of incident light, a component in the incident light that has an electric field vector perpendicular to the fine metallic wires (i.e. p-polarized light) is transmitted, while a component in the incident light that has an electric field vector in parallel to the fine metallic wires (i.e. s-polarized light) is reflected.

As wire-grid polarizers showing a polarization separation ability in the visible light region, the following types are known.

(1) A wire-grid polarizer having fine metallic wires disposed at certain pitches on a light-transmitting substrate (Patent Document 1)

(2) A wire-grid polarizer having a plurality of ridges formed at certain pitches on a light-transmitting substrate, the ridges having a top face and lateral faces covered with a material film of metal or a metal compound to form fine metallic wires (Patent Document 2)

(3) A wire-grid polarizer having a plurality of ridges formed at certain pitches on a light-transmitting substrate, the ridges having a metal layer disposed thereon to form fine metallic wires (FIG. 3 of Patent Document 3)

(4) A wire-grid polarizer having a plurality of ridges formed at certain pitches on a light-transmitting substrate, the ridges having a metal plate member disposed thereon to form fine metallic wires (Patent Document 4)

Among them, the wire-grid polarizer in item (1) has a low productivity since the fine metallic wires are disposed by lithography.

The wire-grid polarizers in items (2), (3) and (4) have a low polarization separation ability since the fine metallic wires are disposed on only the ridges. The optical properties vary depending on the angle or wavelength of incident light.

PRIOR ART DOCUMENTS

Patent Documents

Patent Document 1: JP-A-2005-070456 (US 2005/0046943 A1, US 2007/0152358 A1)
Patent Document 2: JP-A-2006-003447
Patent Document 3: WO 2006/064693 A1 (US 2008/0129931 A1)
Patent Document 1: JP-A-2005-181990 (US 2005/0123588 A1)

DISCLOSURE OF INVENTION

Technical Problem

The present invention provides a wire-grid polarizer, which has not only a high degree of polarization, a high p-polarized light transmittance and a high s-polarized light reflectance but also a low angle dependency and a low wavelength dependency in terms of optical properties in a visible light region, and a process for producing the same.

Solution to Problem

The wire-grid polarizer according to the present invention includes a light-transmitting substrate having a plurality of ridges formed in parallel to one another at certain pitches through respective flat portions disposed between adjacent ridges, each of the ridges having a width gradually reduced from a base portion to a top portion thereof; and a metal layer composed of metal or a metal compound, the metal layer covering the entirety of a first lateral face of each ridge and a part of the flat portion adjacent to the first lateral face such that a second lateral face of each ridge is covered with no metal layer or is partially covered with the metal layer.

It is preferred that the ratio (Hm1/Hp) of the height Hm1 of the metal layer covering the first lateral face of each ridge to the height Hp of the ridge be from 1 to 2.

It is preferred that each ridge be formed in a triangular or trapezoidal shape in section in a direction orthogonal to a longitudinal direction thereof.

When each ridge is formed in a trapezoidal shape in section in the direction orthogonal to the longitudinal direction, it is preferred that the top portion of the ridge have a width Dtp set to at most half of the width Dbp of the base portion of the ridge.

In a case where the base portion of each ridge and a flat portion adjacent thereto form a repetitive unit, when the width of the base portion and the width of the adjacent flat portion have a ridge pitch Pp as a total width, it is preferred that the pitch Pp be at most 300 nm.

It is preferred that the ratio (Dbp/Pp) of the value of Dbp to the value of Pp be from 0.1 to 0.7.

The height Hm1 of the metal layer means a total value of the height of a ridge and the thickness of the metal layer in a direction vertical to the principal plane of the light-transmitting substrate, the metal layer being disposed so as to cover the top of each ridge. In the present invention, since the metal layer is disposed at a certain width on the entirety of the first lateral face of each ridge, i.e. from a lower end to an upper end of the first lateral face, the height of the metal layer disposed on the first lateral face area may be supposed to be equal to the height of the ridge.

The process for producing a wire-grid polarizer according to the present invention is a process for producing a wire-grid polarizer including a light-transmitting substrate having a plurality of ridges formed in parallel to one another at certain pitches through respective flat portions disposed between adjacent ridges, each of the ridges having a width gradually reduced from a base portion to a top portion thereof; and a metal layer composed of metal or a metal compound, the metal layer covering the entirety of a first lateral face of each ridge and a part of the flat portion adjacent to the first lateral face such that a second lateral face of each ridge is covered with no metal layer or is partially covered with the metal layer, wherein the process includes vapor-depositing the metal or the metal compound on the first lateral face from a direction that is substantially orthogonal to a longitudinal direction of the ridges and forms an angle of from 25 to 40 degrees with respect to a height direction of the ridges on the side of the first lateral face under conditions where the metal layer is disposed at a deposition amount of from 40 to 60 nm.

It is preferred that the ratio (Hm1/Hp) of the height Hm1 of the metal layer covering the first lateral face of each ridge to the height Hp of the ridge be from 1 to 2.

It is preferred that each ridge be formed in a triangular or trapezoidal shape in section in a direction orthogonal to a longitudinal direction thereof.

When each ridge is trapezoidal in section in the direction orthogonal to the longitudinal direction, it is preferred that the top portion of the ridge have a width Dtp set to at most half of the width Dbp of the base portion of the ridge.

It is preferred that each ridge be composed of a photocurable resin or a thermoplastic resin and be formed by imprinting technology.

Advantageous Effects of Invention

The wire-grid polarizer according to the present invention has not only a high degree of polarization, a high p-polarized light transmittance and a high s-polarized light reflectance but also a low angle dependency and a low wavelength dependency in terms of optical properties in the visible light region.

The process for producing a wire-grid polarizer according to the present invention is capable of producing a wire-grid polarizer, which has not only a high degree of polarization, a high p-polarized light transmittance and a high s-polarized light reflectance but also a low angle dependency and a low wavelength dependency in terms of optical properties in the visible light region.

In particular, according to the present invention, it is possible to obtain a wire-grid polarizer, which has a p-polarized light transmittance of at least 70%, an s-polarized light reflectance of at least 70% and a degree of polarization of at least 99.5%.

DESCRIPTION OF EMBODIMENTS

<Wire-Grid Polarizer>

The wire-grid polarizer according to the present invention includes a light-transmitting substrate having a plurality of ridges formed in parallel to one another at certain pitches through respective flat portions disposed between adjacent ridges, each of the ridges having a width gradually reduced from a base portion to a top portion thereof; and a metal layer composed of metal or a metal compound, the metal layer covering the entirety of a first lateral face of each ridge. The metal layer on each ridge has a linear shape extending in the longitudinal direction of the ridge and corresponds to a fine metallic wire forming a part of the wire-grid polarizer.

(Light-Transmitting Substrate)

The light-transmitting substrate is a substrate having a light-transmitting property in a wavelength range to be used for the wire-grid polarizer. The light-transmitting property means a property of transmitting light, and the wavelength range is specifically a range of from 400 nm to 800 nm. The light-transmitting substrate preferably has an average light transmittance of at least 85% in such a wavelength range of from 400 nm to 800 nm.

In the present invention, each ridge is a portion which projects from a principal plane (a flat portion) of the light-transmitting substrate and extends in one direction. The ridges may be integrally formed with the principal plane of the light-transmitting substrate and made of the same material as the material of the principal plane portion of the light-transmitting substrate, or may be made of a light-transmitting material different from the material of the principal plane portion of the light-transmitting substrate. The ridges are preferably integrally formed with the principal plane of the light-transmitting substrate and made of the same material as the principal plane portion of the light-transmitting substrate. Further, the ridges are preferably formed by molding at least the principal plane portion of the light-transmitting substrate.

It is sufficient that the ridges are formed in substantially parallel to one another. It is not essential that the ridges be formed in completely parallel to one another. Although each ridge is preferably formed in a linear shape so as to most readily exhibit an optical anisotropy in a plane thereof, each ridge may be formed in a curved shape or a bent shape so as not to have contact with its adjacent ridge.

It is preferred that each ridge have a substantially constant shape, throughout the longitudinal direction, in section in a direction orthogonal to the longitudinal direction and the principal plane of the light-transmitting substrate, and that all ridges have a substantially constant cross-sectional shape. Each ridge has such a cross-sectional shape that has a width gradually reduced from a base portion (the principal plane of the light-transmitting substrate) to a top portion thereof. Examples of the specific cross-sectional shape include a triangular shape and a trapezoidal shape. The cross-sectional shape may have an apex or a side (lateral face) curved. It is preferred that the width of the pitch between adjacent ridges that are formed in parallel or substantially parallel to each other on the light-transmitting substrate, i.e. the width of the respective flat portions be constant.

In the present invention, the top portion of each ridge means a portion that is the highest portion in the cross-sectional shape and continues in the longitudinal direction of the ridge. The top portion of each ridge may form a plane or a line. For example, when the cross-sectional shape is trapezoidal, the top portion forms a plane, and when the cross-sectional shape is triangular, the top portion forms a line. In the present invention, faces other than the top portion of each ridge are referred to as lateral faces. It should be noted that the face between two adjacent ridges (the flat portion of the groove between two adjacent ridges) is not referred to as a face of the ridges and is referred to as the principal plane of the light-transmitting substrate.

The material of the light-transmitting substrate may, for example, be a photocurable resin, a thermoplastic resin or glass. A photocurable resin or a thermoplastic resin is preferred since the use of such resins allows the ridges to be formed by imprinting technology, which will be described later. A photocurable resin is particularly preferred since the use of this resin allows the ridges to be formed by photoimprinting technology and to be excellent in heat resistance and durability. The photocurable resin is preferably a photocurable resin obtained by photocuring a photocurable composition photocurable by photo-radical polymerization, in terms of productivity.

The photocurable composition is preferably one that a photocured film has a contact angle of at least 90 degrees to water. In a case where such a cured film has a contact angle of at least 90 degrees to water, when the ridges are formed by photoimprinting technology, the releasability from a mold will be good, highly accurate transcription will be possible, and a wire-grid polarizer to be obtained will have a desired performance at a sufficient level. Further, even if the contact angle is large, the metal layer can adhere without any problem.

(Fine Metallic Wire)

In the wire-grid polarizer according to the present invention, the fine metallic wires are constituted by a metal layer, which extends in the longitudinal direction of the ridges so as to form wires having a certain width. Although the metal layer covers the entirety of the first lateral face of each ridge and a part of the flat portion adjacent to the first lateral face, the metal layer is not disposed on the remaining portions of the flat portion. The metal layer has a width ranging preferably from 10 nm to 50 nm on its covering portion of the flat portion adjacent to the metal layer disposed on the first lateral face of each ridge. The metal layer may entirely or partially cover the top portion of each ridge. Or, the metal layer may cover the entirety of the top portion of each ridge and a portion of a second lateral face of each ridge. In order to prevent transmittance from lowering, it should be avoided that the metal layer is disposed so as to cover the entirety of the second lateral face. The metal layer that covers the entirety of the first lateral face of each ridge, partly covers the flat portion between the ridge and its adjacent ridge, covers the top portion of the ridge and partly covers the second lateral face of the ridge is normally disposed in a continuous form. Although it is preferred that the metal layer entirely cover the first lateral face of each ridge, the metal layer does not cover a tiny portion of the first lateral face in some cases for the purpose of facilitating production or another purpose. Even in such a case, when the metal layer almost entirely covers the first lateral face of each ridge, the metal layer may be regarded as entirely covering the first lateral face. It is preferred that a portion of the metal layer disposed on the second lateral face of each ridge be disposed on a lateral face area having a width of at most 5/100 of the entire width of the second lateral face extending downward from the top portion of the ridge.

The material of the metal layer may be any metal material having a sufficient electrical conductivity. The material is preferably selected, taking into account properties such as corrosion resistance besides electrical conductivity. Examples of the metal material include metal and a metal compound.

As the metal material, a metal alone, an alloy or a metal containing a dopant or an impurity may, for example, be mentioned. Specific examples of the metal material include aluminum, silver, chromium, magnesium, an aluminum-based alloy and a silver-based alloy.

The material of the metal layer is preferably aluminum, an aluminum-based alloy, silver, chromium or magnesium in view of a high reflectance to visible light, small absorption of visible light and a high electrical conductivity, and it is particularly preferably aluminum or an aluminum-based alloy.

The metal layer is preferably formed by vapor deposition. As the vapor deposition, physical vapor deposition (PVD) or chemical vapor deposition (CVD) may be mentioned. Vacuum vapor deposition, sputtering or ion-plating is preferred, and vacuum vapor deposition is particularly preferred. In the vacuum vapor deposition, it is easy to control the incident direction of adhering fine particles with respect to the light-transmitting substrate, and it is easy to carry out oblique evaporation described later. In the formation of the metal layer, since it is necessary to selectively vapor-deposit metal or a metal compound to cover the first lateral face of each ridge and a part of the flat portion formed between the ridge and its adjacent ridge, the vapor deposition is most preferably oblique evaporation using vacuum vapor deposition.

(Protection Layer)

Even if a fine metallic wire is slightly scratched, the performance of the wire-grid polarizer is adversely affected since the metal layer is significant fine. Further, there is a case where the electric conductivity of the fine metallic wires is reduced by a chemical change (such as the formation of rust) by, e.g. oxidization, which deteriorates the performance of the wire-grid polarizer in some cases. Accordingly, in order to suppress, e.g. the formation of a scratch on the metal layer and a chemical change in the metal layer, the protection layer may cover not only the surface of the metal layer but also an exposed surface of the light-transmitting substrate. Alternatively, the protection layer may be formed so as to entirely fill the groove between adjacent ridges such that the surface with the metal layer formed thereon is made flat.

As the material of the protection layer, a resin, a metal oxide or glass may, for example, be mentioned. Although the material of a protection layer covering only the metal layer may be a non-light-transmitting, opaque material, the material of a protection layer covering other surfaces as well should be a material that can form a light-transmitting protection layer. Even in a case where the light-transmittance of the material itself is low, it is possible to employ that material to form such a light-transmitting protection layer as long as the formed protection layer is sufficiently thin. Further, the material of the protection layer may be preferably a material having a high heat resistance and a high chemical durability. The surface of the metal layer may be naturally or positively altered to form a protection layer by a chemical change. For example, in a case of employing aluminum as the material of the metal layer, aluminum is oxidized in the air to form an aluminum oxide thin film on the surface, and the metal oxide thin film functions as a protection layer for the fine metallic wires. The protection layer has a thickness of preferably from 1 to 20 nm. When the surface of the metal layer is naturally altered to form a protection layer by a chemical change, the protection layer has a thickness of particularly preferably from 1 to 10 nm. When the surface of the metal layer is positively altered to form a protection layer by a chemical change, the protection layer has a thickness of particularly preferably from 3 to 20 nm.

When the protection layer also covers the principal plane of the light-transmitting substrate, p-polarized light reflectance may be reduced at the interface between the protection layer and the principal plane. For this reason, it is preferred to substantially conform the refractive index of the protection layer to the refractive index of the light-transmitting substrate. Further, in order to obtain a high polarization separation ability for broadband spectrum, the protection layer is preferably made of a material having a low refractive index and is more preferably made of a material having a refractive index of at most 1.55 for example.

Since the protection layer is present on the outermost surface of the wire-grid polarizer, the protection layer has a pencil hardness of preferably at least H, and preferably has a stain resistance as well. Further, the protection layer may have an antireflective structure (such as an antireflective film) disposed on a front side thereof. Furthermore, the light-transmitting substrate may have a hard surface layer or an antireflective structure disposed on a rear plane thereof.

<Process for Producing Wire-Grid Polarizer>

The wire-grid polarizer is produced by preparing a light-transmitting substrate having the plural ridges formed in parallel to one another at certain pitches thereon, followed by disposing the metal layer on the entirety of the first lateral face of the ridges and a part of the flat portions adjacent to the first lateral face.

(Preparation of Light-Transmitting Substrate)

The process for producing the light-transmitting substrate may, for example, be performed by imprinting technology (photoimprinting technology or thermal-imprinting technology) or lithography. In order to form the ridges with high productivity and provide the light-transmitting substrate with a large area, the imprinting technology is preferred. In order to form the ridges with higher productivity and transfer the grooves of a mold with high precision, the photoimprinting technology is preferred.

The photoimprinting technology is, for example, a method of preparing a mold in which a plurality of grooves are formed in parallel to one another at certain pitches by a combination of electron beam lithography and etching, transferring the grooves of the mold onto a photocurable composition applied on a base member and simultaneously photocuring the photocurable composition.

The preparation of the light-transmitting substrate by the photoimprinting technology is preferably specifically carried out through the following specific steps (i) to (iv).

(i) a step of applying a photocurable composition on a base member (ii) a step of pressing a mold with a plurality of grooves formed so as to be parallel to one another at certain pitches, against the photocurable composition such that the grooves have contact with the photocurable composition (iii) a step of radiating the photocurable composition with radiation (UV rays, electron beams, etc.) in such a state that the mold is pressed against the photocurable composition, in order to cure the photocurable composition to produce a light-transmitting substrate having a plurality of ridges corresponding to the grooves of the mold.

(iv) a step of separating the mold from the light-transmitting substrate

On the light-transmitting substrate thus obtained on the base member, the formation of the metal layer described later may be made with the substrate being integrally combined with the base member. As required, the light-transmitting substrate may be separated from the base member after formation of the metal layer. The formation of the metal layer described later may be made after the light-transmitting substrate is separated from the base member on which the light-transmitting substrate has been prepared.

The preparation of the light-transmitting substrate by the thermal-imprinting technology is preferably carried out through the following specific steps (i) to (iii).

(i) a step of forming, on a base member, a thermoplastic resin layer where a pattern is transferred, or a step of producing a thermoplastic resin film where a pattern is transferred (ii) a step of pressing a mold with a plurality of grooves formed so as to be parallel to one another at certain pitches, against the transferred layer or the transferred film, such that the grooves have contact with the transferred layer or the transferred film, the transferred layer or the transferred film being heated to at least the glass transition temperature (Tg) or the melting point (Tm) of the thermoplastic resin, thereby to form a light-transmitting substrate having a plurality of ridges corresponding to the grooves of the mold (iii) a step of cooling the light-transmitting substrate to a temperature lower than Tg or Tm and separating the light-transmitting substrate from the mold On the light-transmitting substrate thus obtained on the base member, the formation of the metal layer described later may be made with the substrate being integrally combined with the base member. As required, the light-transmitting substrate may be separated from the base member after formation of the metal layer. The formation of the metal layer described later may be made after the light-transmitting substrate is separated from the base member on which the light-transmitting substrate has been prepared.

The material of the mold employed in the imprinting technology may be, for example, silicon, nickel, quartz or a resin. A resin is preferred in terms of transfer precision. Examples of the resin include a fluororesin (such as ethylene-tetrafluoroethylene copolymer), a cyclic olefin, a silicone resin, an epoxy resin and an acrylic resin. Among them, a photocurable acrylic resin is preferred in order to fabricate the mold with high precision. A resin mold is preferred to have an inorganic layer with a thickness of from 2 to 10 nm thereon in terms of durability to repeated transferring operations. The inorganic layer is preferably an oxide film, such as a $SiO_2$ film, a $TiO_2$ film or an $Al_2O_3$ film.

Examples of the base member employed in the imprinting technology include a glass plate (such as a quartz glass plate or an alkali-free glass plate), a resin film (made of, e.g. polyethylene terephthalate, polybutylene terephthalate, polyethylene naphthalate, polydimethylsiloxane or a transparent fluororesin). When the base member is a glass plate, the imprinting technology may be made in a sheet-feeding system. When the base member is a film, the imprinting technology may be made in a roll-to-roll system.

(Formation of Metal Layer)

The method of forming the metal layer is preferably an oblique vapor deposition method using vacuum deposition, with a view to forming the metal layer on the entirety of the first lateral face of each ridge and a part of the flat portion located between the ridge and its adjacent ridge and adjacent to the first lateral face.

Specifically, a target metal layer may be formed by vapor-depositing metal or a metal compound from a direction substantially orthogonal to the longitudinal direction of each ridge and forming an angle of from 25 to 40 degrees toward the first lateral face with respect to the height direction of each ridge under conditions where an amount of vapor deposition of from 40 to 60 nm is obtained.

The conditions where an amount of vapor deposition of from 40 to 60 nm is obtained means that the metal layer, which is formed on the areas without the ridges (the flat portions) by vapor-depositing such metal or a metal compound when forming the metal layer on the ridges, has a thickness Hm' of from 40 to 60 nm.

With regard to how to find the conditions for obtaining the desired amount of vapor deposition, certain metal or a certain metal compound may be vapor-deposited on the flat portions of preliminarily prepared light-transmitting substrates for finding the conditions, from certain different directions in order to see the vapor conditions that the metal layer on the flat portions has a metal a thickness of from 40 to 60 nm. Examples of the method for consecutively forming the metal layer on the ridges of the light-transmitting substrate fabricated on a base member by an oblique vapor deposition method include a roll-to-roll system and a sheet-feeding system. The metal layer may be formed in such a state that the light-transmitting substrate is integrally formed with the base member. The base member and the vapor deposition source are placed so as to confront each other such that an imaginary line substantially orthogonal to the longitudinal direction of each ridge on the substrate and forming the certain angle (an angle of from 25 to 40 degrees) toward the first lateral face with respect to the height direction of each ridge conforms to the direction to emit a vapor deposition material from the vapor deposition source.

When the base member is flexible as in a film, it is possible to realize a high productivity since the ridges can be formed by the imprinting technology using a roll-to-roll system, followed by consecutively forming the metal layer by an oblique vapor deposition method.

When the base member is rigid as in a glass plate, it is possible to employ an oblique vapor deposition method to consecutively form the metal layer by, e.g. a method where the vapor deposition source is placed so as to be slant to a base member carried in a horizontal direction or a vertical direction, a method to utilize a component of a vapor deposition material that is obliquely emitted toward a base member carried in a horizontal direction or a vertical direction, a method to utilize a component of a vapor deposition material that is vertically emitted toward a base member carried in an oblique direction, or a method to employ the vapor deposition source, which is movable with respect to a fixed base member.

When the polarizer is employed in a polarizing plate, the transmission axis of light is parallel to a diagonal line of a glass plate in many cases. In such a case, it is possible to selectively form the metal layer on the ridges by interposing a slit between the base plate and the vapor deposition source, the slit having linear openings formed therein so as to have a proper angle to each side of the glass plate, or the longitudinal direction of the slit being parallel to the longitudinal direction of the ridges.

<Embodiment of Wire-Grid Polarizer>

Now, embodiments of the wire-grid polarizer according to the present invention will be described with reference to drawings. The drawings are schematic views, and an actual product of the wire-grid polarizer does not have a logical and ideal shape as shown in these drawings. An actual product of the wire-grid polarizer has slight deformation in the shape of the ridges etc. and a slight unevenness in the thickness of the metal layer.

The dimensions of each ridge and the dimensions of the metal layer are determined by detecting the maximum value of the dimensions of five ridges and the maximum values of the dimensions of the respective parts of the metal layer on the five ridges based on cross-sectional images of wire-grid polarizers taken by a scanning electron microscope or a transmission electron microscope, and finding the average value of the maximum values of the five ridges and the average value of the maximum values of the respective parts of the metal layer on the five ridges.

[First Embodiment]

Figure 1:
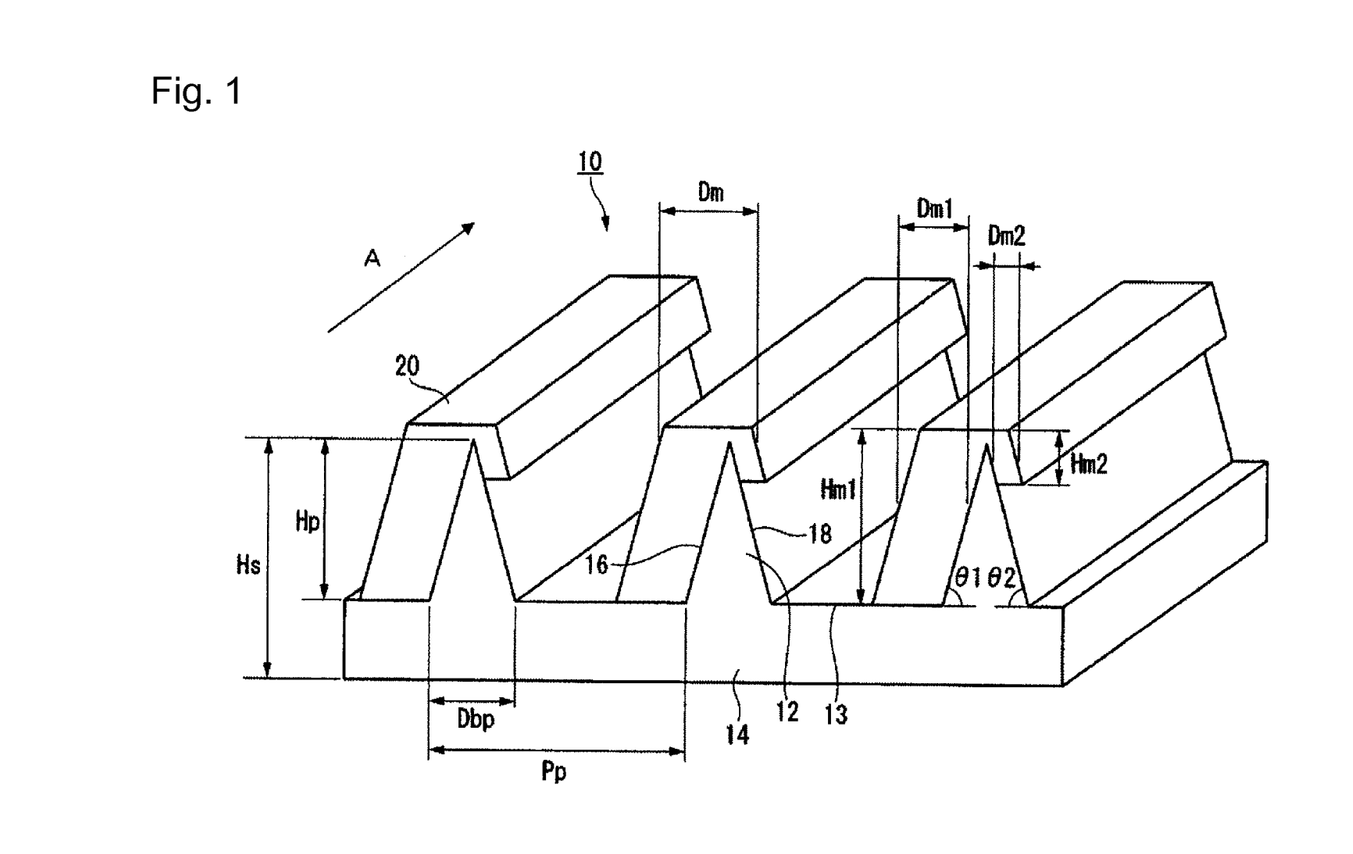
FIG. 1 is a perspective view showing the wire-grid polarizer according to an embodiment of the present invention.

FIG. 1 is a perspective view showing the wire-grid polarizer according to a first embodiment of the present invention. The wire-grid polarizer 10 includes a light-transmitting substrate 14 having a plurality of ridges 12 formed in parallel to one another at certain pitches Pp through respective flat portions 13 disposed between adjacent ridges 12, each of the ridges extending in an direction indicated by an arrow A and having a triangular cross section; and a metal layer 20 composed of metal or a metal compound, the metal layer covering the entirety of a first lateral face 16 of each ridge 12, a part of the flat portion 13 adjacent to the first lateral face 16, between adjacent ridges 12, and a part of a second lateral face 18 of each ridge 12 adjacent to the first lateral face 16 such that the remaining part of the flat portion 13 and the remaining part of the second lateral face 18 are covered with no metal layer. The metal layer 20 extends in the longitudinal direction of each ridge 12 to form a plurality of fine metallic wires.

Pp is the total of the width Dbp of a base portion of a ridge 12 and the width of the flat portion 13 between the ridge 12 and its adjacent ridge 12. Pp is preferably at most 300 nm and at least 50 nm, more preferably from 50 to 250 nm. When Pp is at most 300 nm, it is possible to have a high s-polarized light reflectance and to have a high degree of polarization even in a short-wavelength region of about 400 nm. It is also possible to suppress the coloring effect due to diffraction. When Pp is from 50 to 200 nm, the metal layer is readily formed by vapor deposition.

The ratio of Dbp to Pp (Dbp/Pp) is preferably from 0.1 to 0.7, more preferably from 0.25 to 0.55. When Dbp/Pp is at least 0.1, it is possible to have a high degree of polarization. When Dbp/Pp is set to at most 0.5, it is possible to suppress the coloring of transmitted light due to interference.

Dbp is preferably from 30 to 100 nm in order to readily form the metal layer 20 by vapor deposition.

The height Hp of each ridge 12 is preferably from 80 to 300 nm, more preferably from 120 to 270 nm. When Hp is at least 80 nm, in particular at least 120 nm, it is possible to have a sufficiently high polarization separation ability. When Hp is at most 300 nm, it is possible to have a minimized wavelength dispersion. When Hp is from 80 to 300 nm, it is possible to readily form the metal layer by vapor deposition.

As shown in FIG. 1, an inclined angle $\theta_1$, at which the first lateral face 16 of each ridge forms with respect to the principal plane of the flat portion of the light-transmitting substrate, and an inclined angle $\theta_2$, at which the second lateral face 18 of each ridge forms with respect to the principal plane, are preferably from 30 to 90 degrees. $\theta_1$ and $\theta_2$ may be the same or different.

The thickness Hs of the light-transmitting substrate 14 is preferably from 0.5 to 1,000 µm, more preferably from 1 to 40 µm.

The metal layer 20 preferably satisfies either one of the following conditions (a) to (c) or all of them.

Condition (a):

Condition (a) is a condition related to the thickness of the metal layer 20.

Dm1 indicates the maximum value of the thickness of the metal layer 20 in the width direction of each ridge 12, the metal layer 20 covering the first lateral face 16 of each ridge.

Dm2 indicates the maximum value of the thickness of the metal layer 20 in the width direction of each ridge 12, the metal layer 20 covering the second lateral face 18 of each ridge.

Dm indicates the width of the metal layer 20 on the top portion of each ridge 12 and is equal to the sum of Dm1 and Dm2.

Dm1 preferably satisfies the following formula (I).

$$0.2 \times (Pp\text{-}Dbp) \leq Dm1 \leq 0.5 \times (Pp\text{-}Dbp) \qquad (I)$$

When Dm1 is at least 0.2×(Pp-Dbp), it is possible to have a high p-polarized light transmittance and a minimized wavelength dispersion. When Dm1 is at most 0.5×(Pp-Dbp), it is possible to have a sufficiently high polarization separation ability.

When the metal layer 20 is formed by an oblique vapor deposition method, although a part of the second lateral face 18 of each ridge 12 is also covered with the metal layer 20, it is preferred to minimize the area of the metal layer 20 covering such a part of the second lateral face 18 in terms of p-polarized light transmittance. From this point of view, Dm2 is preferably from 0 to 20 nm. When Dm2 is at most 20 nm, it is possible to have a high p-polarized light transmittance and a sufficiently reduced wavelength dependency in terms of optical properties.

Dm preferably satisfies the following formula (II).

$$0.25 \times (Pp\text{-}Dbp) \leq Dm2 \leq 0.6 \times (Pp\text{-}Dbp) \qquad (II)$$

When Dm is at least 0.25×(Pp-Dbp), it is possible to have a sufficiently high polarization separation ability. When Dm is at most 0.6×(Pp-Dbp), it is possible to expand the space of the respective flat portions 13 between adjacent ridges, thereby having a high p-polarized light transmittance.

Condition (b):

Condition (b) is related to the height of the metal layer 20.

Hm1 indicates the height of the metal layer 20 covering the first lateral face 16 of each ridge 12.

Hm2 indicates the height of the metal layer 20 covering the second lateral face 16 of each ridge 12.

It should be noted that the height of the metal layer 20 does not contain the thickness of a protection layer when the protection layer is formed on the metal layer.

Hm1 is preferably from 80 to 340 nm, more preferably from 120 to 310 nm. When Hm1 is at least 80 nm, it is possible to suppress the crystallization of the metal layer 20, thereby having a high s-polarized light reflectivity. When Hm1 is at least 340 nm, it is possible to have a sufficiently high polarization separation ability in the short-wavelength region.

As described above, it is preferred to minimize the area of the metal layer 20 formed on such a part of the second lateral face 18 in terms of p-polarized light transmittance. From this point of view, Hm2 is preferably from 0 to 20 nm. When Hm2 is at least 20 nm, it is possible to have a high p-polarized light transmittance and a sufficiently reduced wavelength dependency in terms of optical properties.

Condition (c):

Hm1/Hp is preferably from 1 to 2, more preferably from 1 to 1.5. When Hm1/Hp is at least 1, it is possible to have an improved polarization separation ability. When Hm1/Hp is at most 2, it is possible to have a sufficiently reduced wavelength dependency in terms of optical properties.

Figure 2:
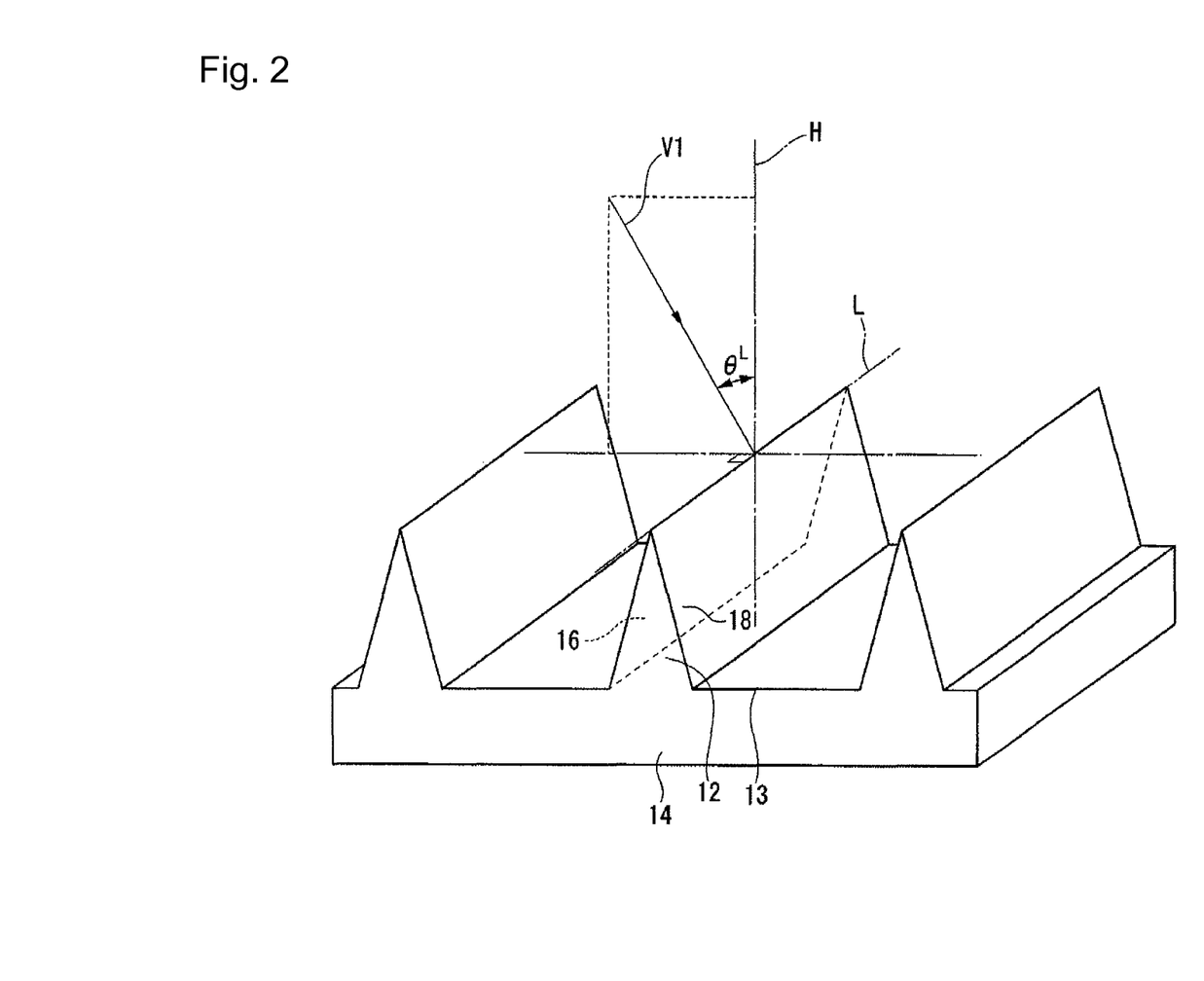
FIG. 2 is a perspective view showing the light-transmitting substrate according to the embodiment of the present invention.

The metal layer 20 may be formed by vapor-depositing metal or a metal compound from a direction substantially orthogonal to the longitudinal direction L of each ridge 12 and forming an angle $\theta^L$ of from 25 to 40 degrees toward the first lateral face 16 with respect to the height direction H of each ridge 12 as shown in FIG. 2 under such conditions where an amount of vapor deposition of from 40 to 60 nm is obtained.

The vapor deposition may be carried out, being dividing into n cycles of operations (provided that n is an integral number of at least 2) under such conditions where a total amount of vapor deposition of from 40 to 60 nm is obtained. The angle $\theta^L_i$ at the i-th cycle of operation (provided that i is an integral number of from 1 to n−1) and the angle $\theta^L_{i+1}$ at the (i+1)-th cycle of operation preferably satisfy the formula of $\theta^L_{i+1} < \theta^L_i$.

The angle $\theta^L$ may be adjusted by use of, e.g. the following vapor deposition system.

A vapor deposition system that the gradient of a light-transmitting substrate 14, which is disposed so as to confront the vapor deposition source, can be modified such that the vapor deposition source is placed on an imaginary line extending in a direction V1 substantially orthogonal to the longitudinal direction L of each ridge 12 and forming the angle $\theta^L$ toward the first lateral face 16 with respect to the height direction H of each ridge 12.

Examples of the vapor deposition source include metal (such as silver, aluminum, chromium and magnesium). Aluminum, an aluminum-based alloy, silver, chromium and magnesium are preferable in terms of having a high reflectance to visible light, a reduced absorption of visible light and a high electrical conductivity. Aluminum and an aluminum-based alloy are particularly preferable.

[Second Embodiment]

Figure 3:
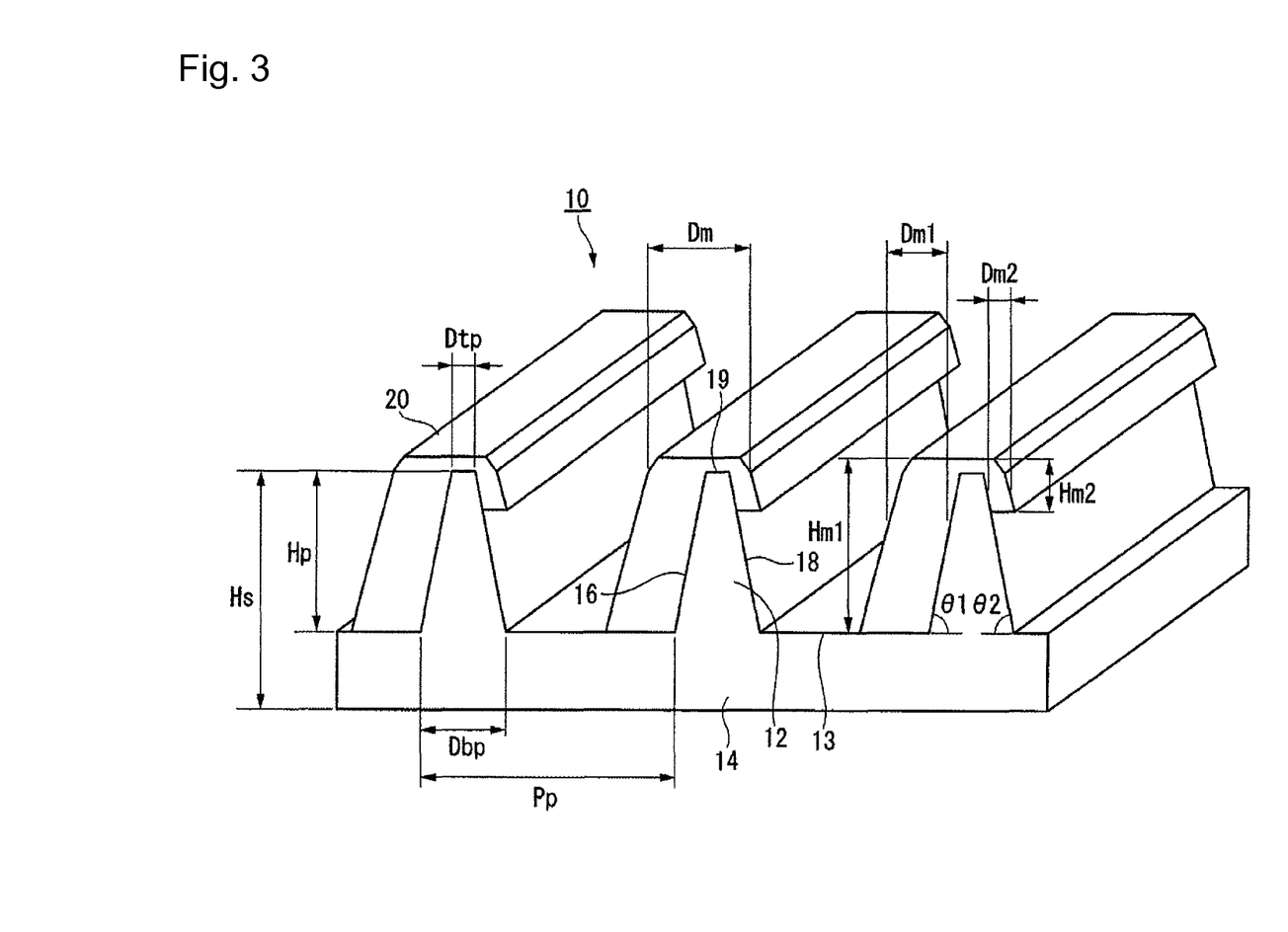
FIG. 3 is a perspective view showing the wire-grid polarizer according to another embodiment of the present invention.

FIG. 3 is a perspective view showing the wire-grid polarizer according to a second embodiment of the present invention. The wire-grid polarizer 10 includes a light-transmitting substrate 14 having a plurality of ridges 12 formed in parallel to one another at certain pitches Pp through the flat portions 13 on the respective grooves disposed between adjacent ridges 12, each of the ridges having a trapezoidal cross section; and a metal layer 20 composed of metal or a metal compound, the metal layer covering the entirety of a first lateral face 16 of each ridge 12, a part of the flat portion 13 adjacent to the first lateral face 16, between adjacent ridges 12, the entirety of a top portion 19 of each ridge 12 adjacent to the first lateral face 16, and a part of a second lateral face 18 of each ridge 12 adjacent to the top portion 19 such that the remaining part of the flat portion 13 and the remaining part of the second lateral portion 18 are covered with no metal layer. The metal layer 20 extends in the longitudinal direction of each ridge 12 to form a plurality of fine metallic wires.

With respect to the second embodiment, explanation will be omitted about the same structure as the wire grid polarizer 10 according to the first embodiment.

The top portion 19 of each ridge 12 has a width Dtp of preferably at most half of Dbp, more preferably at most 40 nm, further more preferably at most 20 nm. When Dtp is at most half of Dbp, it is possible to have a higher light transmittance and a sufficiently reduced angle dependency.

Dm is the width of the metal layer 20 covering the top portion 19 of each ridge 12 and is substantially equal to the sum of Dm1, Dm2 and Dtp.

Figure 4:
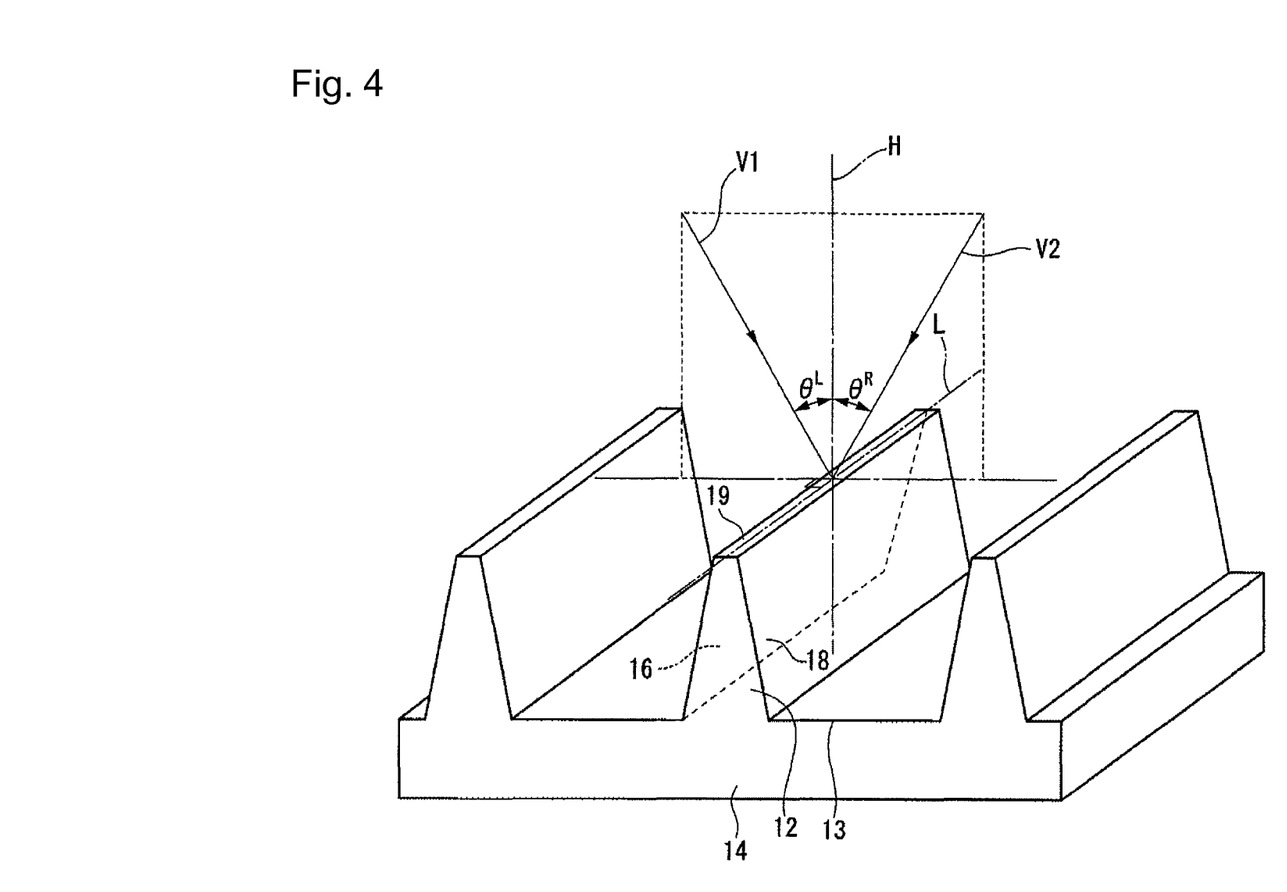
FIG. 4 is a perspective view showing the light-transmitting substrate according to the latter embodiment of the present invention.

The metal layer 20 may be formed in the same manner as the metal layer 20 of the wire grid polarizer 10 according to the first embodiment. If the use of the same manner as the first embodiment makes the thickness of the metal layer 20 insufficient, the metal or metal compound may be vapor-deposited from a direction V2 substantially orthogonal to the longitudinal direction L of each ridge 12 and forming an angle $\theta^R$ of from 25 to 40 degrees toward the second lateral face 18 with respect to the height direction H of each ridge 12 as shown in FIG. 4 under such conditions where an amount of vapor deposition of 20 nm is obtained.

The wire-grid polarizer according to the present invention just described is configured such that each of the ridges formed on the light-transmitting substrate has a width gradually reduced from the base portion to the top portion thereof and that the entirety of the first lateral face of each ridge and a part of the flat portion adjacent to the first lateral face, between adjacent ridges are covered with the metal layer, whereby it is possible to have not only a high degree of polarization, a high p-polarized light transmittance and a high s-polarized light reflectance in a visible light region but also a low angle dependency and a low wavelength dependency in terms of optical properties.

On the other hand, the conventional wire-grid polarizers have a high angle dependency and a high wavelength dependency in terms of optical properties since the metal layer is formed only on the ridges and since the respective flat portions between adjacent ridges are not covered with the metal layer.

In the process for producing the wire-grid polarizer according to the present invention described above, the metal layer is formed by vapor-depositing metal or a metal compound from the direction substantially orthogonal to the longitudinal direction in each ridge and forming an angle θ of from 25 to 40 degrees toward the first lateral face with respect to the height direction of each ridge under such conditions where an amount of vapor deposition of from 40 to 60 nm is obtained. As a result, it is possible to produce a wire-grid polarizer that has not only a high degree of polarization, a high p-polarize light transmittance and a high s-polarized light reflectance in the visible light region but also a low angle dependency and a low wavelength dependency in terms of optical properties.

Although the above-mentioned explanation of FIGS. 1 and 2 of the wire-grid polarizer according to the first and second embodiments of the present invention has been made about a case where the first lateral side of each ridge is a left lateral face of each ridge and is entirely covered with the metal layer and where the second lateral face of each ridge is a right lateral face of each ridge and has an upper portion covered with the metal layer, the first lateral face may form a right lateral face of each ridge in these figures, and the second lateral face may form a left lateral face of each ridge in these figures.

EXAMPLES

Now, the present invention will be described in further detail with reference to Examples. However, it should be understood that the present invention is by no means restricted to such specific Examples.

Examples 1 to 12 are Examples of the present invention, and Examples 13 to 21 are Comparative Examples.

(Dimensions of Metal Layer)

The respective dimensions of the metal layer were determined by detecting the maximum values of the respective dimensions of five ridges based on cross-sectional images of wire-grid polarizers taken by a transmission electron microscope (provided that Dm, Dm1, Dm2 are the above defined values), and finding the average value of the five maximum values.

(Transmittance)

The transmittance was measured by use of an ultraviolet visible spectrophotometer (manufactured by JASCO Corporation, V-7200). The measurement was performed by setting the polarizer of the spectrophotometer between a light source and a wire-grid polarizer so as to have its absorption axis in parallel to the long axis of the fine metallic wires of the wire-grid polarizer and by entering polarized light from the front side of the wire-grid polarizer (the side with the metal layer formed thereon). The wavelengths used for the measurement were, 450 nm, 550 nm and 650 nm.

A p-polarized transmittance of at least 80% was evaluated as ○, a transmittance of at least 70% and less than 80% were evaluated as Δ, and a transmittance of less than 70% was evaluated as x.

(Reflectance)

The reflectance was measured by use of the ultraviolet visible spectrophotometer (manufactured by JASCO Corporation, V-7200). The measurement was performed by setting the polarizer of the spectrophotometer between the light source and a wire-grid polarizer so as to have its absorption axis in parallel to the long axis of the fine metallic wires of the wire-grid polarizer and by guiding polarized light at an angle of 5 degrees with respect to the front side of the wire-grid polarizer. The wavelengths used for the measurement were 450 nm, 550 nm and 650 nm.

An s-polarized light reflectance of at least 80% was evaluated as ○, an s-polarized light reflectance of at least 70% and less than 80% were evaluated as Δ, and an s-polarized light reflectance of less than 70% was evaluated as x.

(Degree of Polarization)

The degree of polarization was calculated from the following formula.

$$\text{Degree of polarization} = ((Tp-Ts)/(Tp+Ts))^{0.5}$$

wherein Tp is the p-polarized light transmittance, and Ts is the s-polarized light transmittance.

A degree of polarization of at least 99.5% was evaluated as ○, and a degree of polarization of less than 99.5% was evaluated as x.

(Angle Dependency)

Cases where the respective differences found by respectively subtracting the value of Tp and the value of Ts that were obtained when the light entered on the front side of each wire-grid polarizer from the height direction H (θ=0 degree) of each ridge, from the value of Tp and the value of Ts that were obtained when light entered on the front side of each wire-grid polarizer from a direction V1 orthogonal to the longitudinal direction L of each ridge and forming an angle $\theta^L=45$ degrees toward the first lateral face with respect to the height direction H of each ridge, and from the value of Tp and the value of Ts that were obtained when the light entered on the front side of each wire-grid polarizer from a direction V2 orthogonal to the longitudinal direction L of each ridge and forming an angle $\theta^R=45$ degrees toward the second lateral face with respect to the height direction H of each ridge were all at most ±5% were evaluated as ○, and cases where at least one of the differences was beyond ±5% were evaluated as x.

(Preparation of Photocurable Composition)

Into a 1,000 mL four-necked flask equipped with a stirrer and a condenser tube, 60 g of a monomer 1 (manufactured by Shin Nakamura Chemical Co., Ltd., NK Ester, A-DPH, dipentaerythritol hexaacrylate), 40 g of a monomer 2 (manufactured by Shin Nakamura Chemical Co., Ltd., NK Ester, A-NPG, neopentyl glycol diacrylate), 4.0 g of a photopolymerization initiator (manufactured by Ciba Specialty Chemicals, IRGACURE 907), 0.1 g of a fluorinated surfactant (manufactured by Asahi Glass Company, Limited, a cooligomer of fluoroacrylate ($CH_2$—$CHCOO(CH_2)_2(CF_2)_8F$) and butyl acrylate, fluorine content: about 30 mass %, mass average molecular weight: about 3,000), 1.0 g of a polymerization inhibitor (manufactured by Wako Pure Chemical Industries, Ltd., Q1301), and 65.0 g of cyclohexanone were put.

In a state where the interior in the flask was at room temperature and shaded, the content was stirred and homogenized for one hour. Then, with stirring the content in the flask, 100 g (solid content: 30 g) of colloidal silica was slowly added, and in a state where the interior in the flask was at room temperature and shaded, the content was stirred and homogenized for one hour. Then, 340 g of cyclohexanone was added, and in a state where the interior in the flask was at room temperature and shaded, the content was stirred for one hour to obtain a solution of a photocurable composition 1.

Example 1

(Preparation of Light-Transmitting Substrate)

A photocurable composition 1 was applied by a spin coating method on the surface of a highly transmitting polyethylene terephthalate (PET) film (manufactured by Teijin DuPont Films Japan Limited, Teijin Tetoron O3, 100 mm×100 mm) having a thickness of 100 µm to form a coating film of the photocurable composition 1 having a thickness of 5 µm.

A quartz mold, which had a plurality of grooves formed at certain pitches so as to extend in parallel to one another through the respective flat portions between adjacent grooves (area: 150 mm×150 mm, pattern area: 100 mm×100 mm, groove pitch Pp: 160 nm, groove width Dbp: 65 nm, groove depth Hp: 200 nm, groove length: 100 mm, cross-sectional shape of groove: substantially isosceles triangle), was pressed against the coating film of the photocurable composition 1 with 0.5 MPa (gauge pressure) and at 25° C. so as to be brought into contact with the coating film of the photocurable composition 1

While this state was maintained, light from a high pressure mercury lamp (frequency: from 1.5 kHz to 2.0 kHz, main wavelength light: 255 nm, 315 nm and 365 nm, irradiation energy at 365 nm: 1,000 mJ) was applied from the PET film side for 15 seconds to cure the photocurable composition 1 to prepare a light-transmitting substrate having a plurality of ridges and respective flat portions between adjacent ridges so as to correspond to the grooves of the quartz mold (ridge pitch Pp: 160 nm, width Dbp of ridge base portion: 65 nm, ridge height Hp: 200 nm, θ1 and θ2: 80.8 degrees). The quartz mold was slowly separated from the light-transmitting substrate.

(Formation of Metal Layer)

Using a vacuum vapor deposition apparatus (manufactured by SHOWA SHINKU CO., LTD., SEC-16CM) capable of changing the gradient of a light-transmitting substrate facing the deposition source, aluminum was deposited on the ridges of the light-transmitting substrate by an oblique vapor deposition method to form the metal layer, thereby to obtain a wire-grid polarizer having a PET film bonded to the rear side.

In this process, the vapor deposition was performed once from the direction V1 substantially orthogonal to the longitudinal direction L of each ridge and forming the angle $\theta^L$ toward the first lateral face with respect to the height direction H of the ridge (i.e. from the first lateral face side). Then, the angle $\theta^L$ in vapor deposition, and the thickness Hm' of the metal layer formed on flat areas having no ridges formed by the vapor deposition were the angle and the thickness shown in Table 1. Hm' was measured by a film thickness monitor including a quartz vibrator as a film thickness sensor.

Examples 2 and 3

Each wire-grid polarizer was obtained in the same way as Example 1 except that the angle $\theta^L$ in vapor deposition, and the thickness Hm' of the metal layer formed by the vapor deposition were the angle and the thickness shown in Table 1 after a light-transmitting substrate was prepared in the same manner as in Example 1.

Example 4

(Preparation of Light-Transmitting Substrate)

Except that the mold was a nickel mold, which had a plurality of grooves formed at certain pitches so as to extend in parallel to one another through respective flat portions between adjacent grooves (area: 150 mm×150 mm, pattern area: 100 mm×100 mm, groove pitch Pp: 150 nm, groove width Dbp: 60 nm, groove depth Hp: 200 nm, groove length: 100 mm, cross-sectional shape of groove: substantially isosceles triangle), a light-transmitting substrate having a plurality of ridges and respective flat portions between adjacent ridges so as to correspond to the grooves of the nickel mold (ridge pitch Pp: 150 nm, ridge width Dbp: 60 nm, ridge height: Hp: 200 nm, θ1 and θ2: 81.5 degrees) was prepared in the same manner as in Example 1.

(Formation of Metal Layer)

A wire-grid polarizer was obtained in the same manner as in Example 1 except that the angle $\theta^L$ in the vapor deposition and the thickness Hm' of the metal layer formed by the vapor deposition were the angle and the thickness shown Table 1.

Examples 5 and 6

Each wire-grid polarizer was obtained in the same manner as in Example 1 except that the angle $\theta^L$ in vapor deposition and the thickness Hm' of the metal layer formed by the vapor deposition were the angle and the thickness shown Table 1 after a light-transmitting substrate was prepared in the same manner as in Example 4.

Example 7

(Preparation of Light-Transmitting Substrate)

Except that the mold was a nickel mold, which had a plurality of grooves formed at certain pitches so as to extend in parallel to one another through respective flat portions between adjacent grooves (area: 150 mm×150 mm, pattern area: 100 mm×100 mm, groove pitch Pp: 150 nm, groove width Dbp: 40 nm, groove depth Hp: 200 nm, groove length: 100 mm, cross-sectional shape of groove: substantially isosceles triangle), a light-transmitting substrate having a plurality of ridges and respective flat portions between adjacent ridges so as to correspond to the grooves of the nickel mold (ridge pitch Pp: 150 nm, ridge width Dbp: 40 nm, ridge height: Hp: 200 nm, θ1 and θ2: 84.3 degrees) was prepared in the same manner as in Example 1.

(Formation of Metal Layer)

A wire-grid polarizer was obtained in the same manner as in Example 1 except that the angle $\theta^L$ in vapor deposition and the thickness Hm' of the metal layer formed by the vapor deposition were the angle and the thickness shown Table 1.

Example 8

(Preparation of Light-Transmitting Substrate)

Except that the mold was a nickel mold, which had a plurality of grooves formed at certain pitches so as to extend in parallel to one another through respective flat portions between adjacent grooves (area: 150 mm×150 mm, pattern area: 100 mm×100 mm, groove pitch Pp: 200 nm, groove width Dbp: 75 nm, groove depth Hp: 160 nm, groove length:

100 mm, cross-sectional shape of groove: substantially isosceles triangle), a light-transmitting substrate having a plurality of ridges and respective flat portions between adjacent ridges so as to correspond to the grooves of the nickel mold (ridge pitch Pp: 200 nm, ridge width Dbp: 75 nm, ridge height: Hp: 160 nm, θ1 and θ2: 76.8 degrees) was prepared in the same manner as in Example 1.
(Formation of Metal Layer)
A wire-grid polarizer was obtained in the same manner as in Example 1 except that the angle $\theta^L$ in vapor deposition and the thickness Hm' of the metal layer formed by the vapor deposition were the angle and the thickness shown Table 1.

Example 9

(Preparation of Light-Transmitting Substrate)
Except that the mold was a nickel mold, which had a plurality of grooves formed at certain pitches so as to extend in parallel to one another through respective flat portions between adjacent grooves (area: 150 mm×150 mm, pattern area: 100 mm×100 mm, groove pitch Pp: 200 nm, groove width Dbp: 60 nm, groove depth Hp: 170 nm, groove length: 100 mm, cross-sectional shape of groove: substantially rectangular triangle), a light-transmitting substrate having a plurality of ridges and respective flat portions between adjacent ridges so as to correspond to the grooves of the nickel mold (ridge pitch Pp: 200 nm, ridge width Dbp: 60 nm, ridge height: Hp: 170 nm, θ1: 70.6 degrees, θ2: 90 degrees) was prepared in the same manner as in Example 1.
(Formation of Metal Layer)
A wire-grid polarizer was obtained in the same manner as in Example 1 except that the angle $\theta^L$ in vapor deposition and the thickness Hm' of the metal layer formed by the vapor deposition were the angle and the thickness shown Table 1.

Example 10

(Preparation of Light-Transmitting Substrate)
Except that the mold was a nickel mold, which had a plurality of grooves formed at certain pitches so as to extend in parallel to one another through respective flat portions between adjacent grooves (area: 150 mm×150 mm, pattern area: 100 mm×100 mm, groove pitch Pp: 200 nm, width of top portion of groove Dbp: 80 nm, width of base portion of groove Dtp: 20 nm, groove depth Hp: 200 nm, groove length: 100 mm, cross-sectional shape of groove: substantially trapezoid), a light-transmitting substrate having a plurality of ridges and respective flat portions between adjacent ridges so as to correspond to the grooves of the nickel mold (ridge pitch Pp: 200 nm, width of base portion of ridge Dbp: 60 nm, width of top portion of ridge Dtp: 20 nm, ridge height: Hp: 200 nm, θ1=θ2: 84.3 degrees) was prepared in the same manner as in Example 1.
(Formation of Metal Layer)
Using the vacuum vapor deposition apparatus (manufactured by SHOWA SHINKU CO., LTD., SEC-16CM) capable of changing the gradient of a light-transmitting substrate facing the deposition source, aluminum was deposited on the ridges of the light-transmitting substrate by the oblique vapor deposition method to form the metal layer, thereby to obtain a wire-grid polarizer having the PET film bonded to the rear side.
In this process, the vapor deposition was performed once from the direction V1 substantially orthogonal to the longitudinal direction L of each ridge and forming the angle $\theta^L$ toward the first lateral face with respect to the height direction H of each ridge (i.e. from the first lateral face side) with the angle $\theta^L$ and the thickness Hm' set to the values shown in Table 1. Then, the vapor deposition was performed once from the direction V2 substantially orthogonal to the longitudinal direction L of each ridge and forming the angle $\theta^R$ toward the second lateral face with respect to the height direction H of each ridge (i.e. from the second lateral face side) with the angle $\theta^R$ and the thickness Hm' set to the values shown in Table 1.

Examples 11 and 12

After each light-transmitting substrate was prepared in the same manner as in Example 10, each wire-grid polarizer was obtained in the same manner as in Example 1 except that the number of vapor deposition, the angle $\theta^L$ (or the angle $\theta^R$) in each vapor deposition, and the thickness Hm' of the metal layer formed by each vapor deposition were set to the values shown in Table 1.

Example 13

After a light-transmitting substrate was prepared in the same manner as in Example 4, a wire-grid polarizer was obtained in the same manner as in Example 1 except that the angle $\theta^L$ in vapor deposition and the thickness Hm' of the metal layer formed by the vapor deposition were the angle and the thickness shown in Table 1.

Example 14

(Preparation of Light-Transmitting Substrate)
Except that the mold was a silicon mold, which had a plurality of grooves formed at certain pitches so as to extend in parallel to one another (area: 20 mm×20 mm, pattern area: 10 mm×10 mm, groove pitch Pp: 215 nm, groove width Dbp: 110 nm, groove depth Hp: 150 nm, groove length: 10 mm, cross-sectional shape of groove: substantially isosceles triangle), a light-transmitting substrate having a plurality of ridges formed so as to correspond to the grooves of the silicon mold (ridge pitch Pp: 215 nm, ridge width Dbp: 110 nm, ridge height: Hp: 150 nm) was prepared in the same manner as in Example 1.
(Formation of Metal Layer)
A wire-grid polarizer was obtained in the same manner as in Example 1 except that the angle $\theta^L$ (or the angle $\theta^R$) in each vapor deposition and the thickness Hm' of the metal layer formed by each vapor deposition were the angle and the thickness shown Table 1.

Example 15

(Preparation of Light-Transmitting Substrate)
In the same manner as in Example 1 except that the mold was a silicon mold, which had a plurality of grooves formed at certain pitches so as to extend in parallel to one another (area: 20 mm×20 mm, pattern area: 10 mm×10 mm, groove pitch Pp: 130 nm, groove width Dbp: 63 nm, groove depth Hp: 15 nm, groove length: 10 mm, cross-sectional shape of groove: substantially isosceles triangle), a light-transmitting substrate was prepared so as to have a plurality of ridges corresponding to the grooves of the silicon mold (ridge pitch Pp: 130 nm, ridge width Dbp: 63 nm, ridge height: Hp: 15 nm).
(Formation of Metal Layer)
In the same manner as in Example 1 except that the angle $\theta^L$ in vapor deposition and the thickness Hm' of the metal layer formed by the vapor deposition were the angle and the thickness shown Table 1, a wire-grid polarizer was obtained.

Example 16

In the same manner as in Example 1 except that the number of the vapor deposition, the angle $\theta^L$ (or the angle $\theta^R$) in each vapor deposition and the thickness Hm' of the metal layer formed by each vapor deposition were set to the angle and the thickness shown in Table 1 after a light-transmitting substrate was prepared in the same manner as in Example 15, a wire-grid polarizer was obtained.

Example 17

In the same manner as in Example 1 except that the mold was a nickel mold, which had a plurality of grooves formed at certain pitches so as to extend in parallel to one another (area: 20 mm×20 mm, pattern area: 10 mm×10 mm, groove pitch Pp: 200 nm, width of top portion of groove Dbp: 65 nm, width of base portion of groove Dtp: 50 nm, groove depth Hp: 100 nm, groove length: 10 mm, cross-sectional shape of groove: substantially trapezoid), a light-transmitting substrate was prepared so as to have a plurality of ridges corresponding to the grooves of the nickel mold (ridge pitch Pp: 200 nm, width of base portion of ridge Dbp: 65 nm, width of top portion of ridge Dtp: 50 nm, ridge height: Hp: 100 nm).
(Formation of Metal Layer)
A wire-grid polarizer was obtained in the same manner as in Example 1 except that the angle $\theta^L$ in vapor deposition and the thickness Hm' of the metal layer formed by the vapor deposition were set to the angle and the thickness shown Table 1.

Example 18

In the same manner as in Example 1 except that the mold was a nickel mold, which had a plurality of grooves formed at certain pitches so as to extend in parallel to one another (area: 20 mm×20 mm, pattern area: 10 mm×10 mm, groove pitch Pp: 200 nm, width of top portion of groove Dbp: 80 nm, width of base portion of groove Dtp: 50 nm, groove depth Hp: 200 nm, groove length: 10 mm, cross-sectional shape of groove: substantially trapezoid), a light-transmitting substrate was prepared so as to have a plurality of ridges corresponding to the grooves of the nickel mold (ridge pitch Pp: 200 nm, width of base portion of ridge Dbp: 80 nm, width of top portion of ridge Dtp: 50 nm, ridge height: Hp: 200 nm).
(Formation of Metal Layer)
A wire-grid polarizer was obtained in the same manner as in Example 1 except that the angle $\theta^L$ in vapor deposition and the thickness Hm' of the metal layer formed by the vapor deposition were set to the angle and the thickness shown Table 1.

Example 19

In the same manner as in Example 1 except that the angle $\theta^L$ in vapor deposition and the thickness Hm' of the metal layer formed by the vapor deposition were set to the angle and the thickness shown in Table 1 after a light-transmitting substrate was prepared in the same manner as in Example 1, a wire-grid polarizer was obtained.

Example 20

In the same manner as in Example 1 except that the mold is a quartz mold, which had a plurality of grooves formed at certain pitches so as to extend in parallel to one another through respective flat portions between adjacent grooves (area: 150 mm×150 mm, pattern area: 100 mm×100 mm, groove pitch Pp: 160 nm, groove width Dp: 65 nm, groove depth Hp: 200 nm, groove length: 100 mm, cross-sectional shape of groove: substantially rectangle), a light-transmitting substrate was prepared so as to have plurality of ridges and respective flat portions between adjacent ridges so as to correspond to the grooves of the quartz mold (ridge pitch Pp: 160 nm, ridge width Dp: 65 nm, ridge height: Hp: 200 nm).
(Formation of Metal Layer)
A wire-grid polarizer was obtained in the same manner as in Example 1 except that the angle $\theta^L$ in vapor deposition and the thickness Hm' of the metal layer formed by the vapor deposition were set to the angle and the thickness shown Table 1.

Example 21

A wire-grid polarizer was obtained in the same manner as in Example 1 except that the angles $\theta^L$ and $\theta^R$ in vapor deposition and the thickness Hm' of the metal layer formed by the vapor deposition were set to the angles and the thickness shown in Table 1 after a light-transmitting substrate was prepared as in the same manner as in Example 1.
[Measurement and Evaluation]
With respect to the wire-grid polarizers in Examples 1 to 21, the dimensions of the respective metal wires were measured. The measurement results are shown in Table 1.

Also, with respect to the wire-grid polarizers in Examples 1 to 21, the transmittance, the reflectance, the degree of polarization and the angle dependency were measured. The measurement results are shown in Table 2.

TABLE 1

| Ex. | Metal layer | | | | | Light-transmitting substrate | | | | First vapor disposition | | Second vapor disposition | | Hm1/Hp |
|---|---|---|---|---|---|---|---|---|---|---|---|---|---|---|
| | Dm | Dm1 | Dm2 | Hm1 | Hm2 | Pp | Dbp | Dtp | Hp | $\theta^L$ | Hm' | $\theta^R$ | Hm' | |
| 1 | 30 | 20 | 10 | 205 | 5 | 160 | 65 | — | 200 | 25 | 50 | | | 1.03 |
| 2 | 35 | 30 | 5 | 205 | 5 | 160 | 65 | — | 200 | 25 | 60 | | | 1.03 |
| 3 | 55 | 50 | 5 | 210 | 10 | 160 | 65 | — | 200 | 30 | 50 | | | 1.05 |
| 4 | 50 | 45 | 5 | 205 | 5 | 150 | 60 | — | 200 | 30 | 60 | | | 1.03 |
| 5 | 45 | 40 | 5 | 210 | 10 | 150 | 60 | — | 200 | 30 | 55 | | | 1.05 |
| 6 | 40 | 35 | 5 | 210 | 10 | 150 | 60 | — | 200 | 30 | 50 | | | 1.05 |
| 7 | 35 | 30 | 5 | 210 | 5 | 150 | 40 | — | 200 | 35 | 45 | | | 1.05 |
| 8 | 35 | 30 | 5 | 165 | 5 | 200 | 75 | — | 160 | 35 | 50 | | | 1.03 |
| 9 | 55 | 50 | 5 | 175 | 10 | 200 | 60 | — | 170 | 35 | 60 | | | 1.03 |
| 10 | 70 | 40 | 10 | 220 | 10 | 200 | 80 | 20 | 200 | 35 | 40 | 30 | 10 | 1.10 |

TABLE 1-continued

| | Metal layer | | | | | Light-transmitting substrate | | | | First vapor disposition | | Second vapor disposition | | Hm1/ |
|---|---|---|---|---|---|---|---|---|---|---|---|---|---|---|
| Ex. | Dm | Dm1 | Dm2 | Hm1 | Hm2 | Pp | Dbp | Dtp | Hp | $\theta^L$ | Hm' | $\theta^R$ | Hm' | Hp |
| 11 | 60 | 30 | 10 | 220 | 10 | 200 | 80 | 20 | 200 | 30 | 40 | 25 | 10 | 1.10 |
| 12 | 55 | 30 | 5 | 210 | 10 | 200 | 80 | 20 | 200 | 35 | 60 | | | 1.05 |
| 13 | 120 | 95 | 25 | 230 | 35 | 150 | 60 | — | 200 | 50 | 100 | | | 1.15 |
| 14 | 70 | 35 | 35 | 70 | 70 | 215 | 110 | — | 150 | 60 | 40 | 60 | 40 | 0.47 |
| 15 | 35 | 18 | 17 | 400 | — | 130 | 63 | — | 15 | 15 | 40 | | | 26.67 |
| 16 | 35 | 35 | — | 260 | — | 130 | 63 | — | 15 | 0 | 35 | 0 | 35 | 17.33 |
| 17 | 70 | — | — | 60 | — | 200 | 65 | 50 | 100 | 45 | 45 | | | 0.60 |
| 18 | 70 | — | — | 60 | — | 200 | 80 | 50 | 200 | 45 | 45 | | | 0.30 |
| 19 | 55 | 50 | 5 | 155 | 5 | 160 | 65 | — | 200 | 45 | 60 | | | 0.78 |
| 20 | 100 | 30 | — | 205 | — | 160 | 65 | 65 | 200 | 30 | 60 | | | 1.03 |
| 21 | 80 | 40 | 40 | 210 | 205 | 160 | 65 | | 200 | 25 | 50 | 25 | 50 | 1.05 |

TABLE 2

| | 450 nm | | | | 550 nm | | | | 700 nm | | | |
|---|---|---|---|---|---|---|---|---|---|---|---|---|
| wavelength Ex. | p-polarized light transmittance | s-polarized light reflectance | Degree of polarization | Angle dependency | p-polarized light transmittance | s-polarized light reflectance | Degree of polarization | Angle dependency | p-polarized light transmittance | s-polarized light reflectance | Degree of polarization | Angle dependency |
| 1 | ○ | ○ | ○ | ○ | ○ | ○ | ○ | ○ | ○ | ○ | ○ | ○ |
| 2 | ○ | ○ | ○ | ○ | ○ | ○ | ○ | ○ | ○ | ○ | ○ | ○ |
| 3 | ○ | ○ | ○ | ○ | ○ | ○ | ○ | ○ | ○ | ○ | ○ | ○ |
| 4 | ○ | ○ | ○ | ○ | ○ | ○ | ○ | ○ | ○ | ○ | ○ | ○ |
| 5 | ○ | ○ | ○ | ○ | ○ | ○ | ○ | ○ | ○ | ○ | ○ | ○ |
| 6 | ○ | ○ | ○ | ○ | ○ | ○ | ○ | ○ | ○ | ○ | ○ | ○ |
| 7 | ○ | ○ | ○ | ○ | ○ | ○ | ○ | ○ | ○ | ○ | ○ | ○ |
| 8 | ○ | ○ | ○ | ○ | ○ | ○ | ○ | ○ | ○ | ○ | ○ | ○ |
| 9 | ○ | ○ | ○ | ○ | ○ | ○ | ○ | ○ | ○ | ○ | ○ | ○ |
| 10 | ○ | ○ | ○ | ○ | ○ | ○ | ○ | ○ | ○ | ○ | ○ | ○ |
| 11 | ○ | ○ | ○ | ○ | ○ | ○ | ○ | ○ | ○ | ○ | ○ | ○ |
| 12 | ○ | ○ | ○ | ○ | ○ | ○ | ○ | ○ | ○ | ○ | ○ | ○ |
| 13 | x | ○ | ○ | x | ○ | ○ | ○ | x | x | ○ | ○ | x |
| 14 | x | ○ | ○ | x | x | ○ | ○ | x | x | ○ | ○ | x |
| 15 | ○ | ○ | ○ | x | ○ | ○ | ○ | x | ○ | ○ | ○ | x |
| 16 | ○ | ○ | ○ | x | ○ | ○ | ○ | x | ○ | ○ | ○ | x |
| 17 | x | ○ | ○ | x | x | ○ | ○ | x | x | ○ | ○ | x |
| 18 | x | ○ | ○ | x | x | ○ | ○ | x | x | ○ | ○ | x |
| 19 | ○ | ○ | x | x | ○ | ○ | x | x | ○ | ○ | x | x |
| 20 | x | ○ | ○ | x | x | ○ | ○ | x | x | ○ | ○ | x |
| 21 | x | ○ | ○ | ○ | x | ○ | ○ | ○ | x | ○ | ○ | ○ |

Each of Examples 1 to 9 had not only a high degree of polarization, a high p-polarized light transmittance and a high s-polarized light reflectance but also a low angle dependency and a low wavelength dependency in terms of optical properties because of having the metal layer, which covered the entirety of the first lateral face of each ridge formed in a triangular shape in section and at least a part of the flat portion adjacent to the first lateral face and located between the ridge and its adjacent ridge.

Each of Examples 10 to 12 had not only a high degree of polarization, a high p-polarized light transmittance and a high-polarized light reflectance but also a low angle dependency and a low wavelength dependency in terms of optical properties because of having the metal layer, which covered the entirety of the first lateral face of each ridge in formed in a substantially trapezoidal shape in section and at least a part of the flat portion adjacent to the first lateral face and located between the ridge and its adjacent ridge.

Example 13 had a reduced p-polarized light transmittance and a high angle dependency in terms of optical properties since the thicknesses Dm1 and Dm2 of the metal layer covering both lateral faces of each ridge were too large such that the respective flat portions between adjacent ridges were almost filled with the metal layer.

In Example 14, which corresponds to the second Example of Patent Document 2, the thickness Dm2 and the height Hm2 of the metal layer, which covered the second lateral face of each ridge formed in a substantially triangular in section, were too large. No metal layer was formed so as to cover the respective flat portions between adjacent ridges. For this reason, the p-polarized light transmittance was reduced, and the angle dependency in terms of optical properties were high.

Examples 15 and 16, which correspond to the fourth and fifth Examples of Patent Document 4, had a high angle dependency and a high wavelength dependency in terms of optical properties since no metal layer was formed so as to cover the respective flat portions between adjacent ridges.

Examples 17 and 18, which correspond to the ninth and tenth Examples of Patent Document 3, had a reduced p-polarized light transmittance and a high angle dependency in terms of optical properties since the metal layer was formed on the top portion of each ridge without the metal layer covering the entirety of the first lateral face of each ridge and the respective flat portions between adjacent ridges.

Example 19 had a reduced s-polarized light reflectance and a high angle dependency in terms of optical properties since the metal layer was insufficiently formed on the first lateral face of each ridge formed in a triangular shape in section because of being not formed so as to cover the respective flat portions between adjacent ridges.

Example 20 had a reduced p-polarized light transmittance and a high angle dependency in terms of optical properties since each ridge was formed in a rectangular shape in section.

Example 21 had a reduced p-polarized light transmittance since the first lateral face and the second lateral face of each ridge were fully covered with the metal layer.

Industrial Applicability

The wire-grid polarizer according to the present invention is useful as the polarizer of an image display device, such as a liquid crystal display device, a rear-projection television or a front projector.

The entire disclosure of Japanese Patent Application No. 2009-025051 filed on Feb. 5, 2009 including specification, claims, drawings and summary is incorporated herein by reference in its entirety.

Reference Symbols
- 10: Wire-grid polarizer
- 12: Ridge
- 13: Flat portion
- 14: Light-transmitting substrate
- 16: First lateral face
- 18: Second lateral face
- 19: Top portion
- 20: Metal layer

What is claimed is:

1. A wire-grid polarizer comprising:
a light-transmitting substrate having a plurality of ridges formed in parallel to one another at certain pitches through respective flat portions disposed between adjacent ridges, each of the ridges having a width gradually reduced from a base portion to a top portion thereof;
a metal layer composed of metal or a metal compound, the metal layer covering the entirety of a first lateral face of each ridge and a part of the flat portion adjacent to the first lateral face such that a second lateral face of each ridge is only partially covered with the metal layer, and
wherein a ratio (Dbp/Pp) of a width Dbp of the base portion of the ridge to each pitch Pp is from 0.1 to 0.7, and wherein $Tp-Tp1=\pm5\%$, $Ts-Ts1=\pm5\%$, $Tp-Tp2=\pm5\%$, and $Ts-Ts2=\pm5\%$, wherein Tp is a value of p-polarized light transmittance, and Ts is a value of s-polarized light transmittance obtained when light enters from a height direction of each ridge, Tp1 is a value of p-polarized light transmittance, and Ts1 is a value of an s-polarized light transmittance obtained when light entered on the first lateral face of each ridge from a direction orthogonal to a longitudinal direction of each ridge and forming an angle of 45 degrees toward the first lateral face with respect to the height direction of each ridge, and Tp2 is a value of p-polarized light transmittance, and Ts2 is a value of an s-polarized light transmittance obtained when light enters on a second lateral face of each ridge from a direction orthogonal to the longitudinal direction of each ridge and forming an angle of 45 degrees toward the second lateral face with respect to the height direction of each ridge.

2. The wire-grid polarizer according to claim 1, wherein each ridge is formed in a triangular or trapezoidal shape in section in a direction orthogonal to a longitudinal direction thereof.

3. The wire-grid polarizer according to claim 1, wherein each ridge is formed in a trapezoidal shape in section in a direction orthogonal to a longitudinal direction: and
the top portion of the ridge has a width Dtp set to at most half of the width Dbp of the base portion of the ridge.

4. The wire-grid polarizer according to claim 1 the p-polarized light transmittance of at least 70%, when the p-polarized light has a wavelength of 450 nm, 550 nm and 700 nm.

5. A wire-grid polarizer comprising:
a light-transmitting substrate having a plurality of ridges formed in parallel to one another at certain pitches through respective flat portions disposed between adjacent ridges, each of the ridges having a width gradually reduced from a base portion to a top portion thereof;
a metal layer composed of metal or a metal compound, the metal layer covering the entirety of a first lateral face of each ridge and a part of the flat portion adjacent to the first lateral face such that a second lateral face of each ridge is only partially covered with the metal layer, and
wherein a ratio (Dbp/Pp) of a width Dbp of the base portion of the ridge to each pitch Pp is from 0.1 to 0.7.

* * * * *